(12) United States Patent
Fischer et al.

(10) Patent No.: US 6,333,494 B1
(45) Date of Patent: Dec. 25, 2001

(54) METHOD OF INDUCTION BRAZING TRANSFORMER STRANDS TO BASE PLATE

(75) Inventors: Todd Joseph Fischer, Ballston Spa, NY (US); Edward James Oziminski, Oak Lawn, IL (US); Vladimir Pilic, Smithtown, NY (US); David Roy Parker, Worcester, NY (US); Roy Cleveland Parker, Worcester, NY (US); Jason Stroosnyder, Worcester, NY (US); John Francis Nolan, Latham, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/729,656

(22) Filed: Dec. 4, 2000

(51) Int. Cl.[7] ...................................................... H05B 6/10
(52) U.S. Cl. ......................... 219/615; 219/605; 219/603; 228/224; 228/262.9
(58) Field of Search .................................... 219/615, 605, 219/603, 616, 617, 635, 85.1, 85.18, 85.14; 228/214, 224, 262.61, 262.9

(56) References Cited

U.S. PATENT DOCUMENTS

| | | | |
|---|---|---|---|
| 2,791,667 | * 5/1957 | Clark et al. | 219/615 |
| 3,431,379 | * 3/1969 | Yrene | 219/615 |
| 3,634,705 | * 1/1972 | Fidei | 310/57 |
| 4,307,966 | * 12/1981 | Spencer et al. | 400/124 |
| 5,504,296 | * 4/1996 | Sato et al. | 219/615 |

* cited by examiner

Primary Examiner—Philip H. Leung
(74) Attorney, Agent, or Firm—Nixon & Vanderhye P.C.

(57) ABSTRACT

A method of brazing a plurality of copper strands to a buss bar includes: a) cleaning the buss bar and the copper strands; b) positioning a filler shim on the surface of the buss bar; c) placing a copper strand on the filler shim, the filler shim and the strand having substantially equal lengths; d) stacking additional copper strands on the buss bar, with a filler shim between each adjacent pair of strands; and e) heating the filler shims utilizing an induction brazing coil to a temperature sufficient to cause melting of the shims and to thereby form a brazed lap joint between the copper strands and the buss bar.

11 Claims, 2 Drawing Sheets

METHOD OF INDUCTION BRAZING TRANSFORMER STRANDS TO BASE PLATE

This invention relates to the manufacture and/or repair of electrical components and specifically, to the joining by induction brazing of metal wires to metal bars, and specifically to the formation of lap joints between copper strands and a copper buss bar in transformer electrical connections.

BACKGROUND OF THE INVENTION

Current techniques for brazing the lap joints of copper wires or strands to a copper buss bars involve either electric brazing using brazing "tongs" or torches. Torch brazing is a labor intensive process, and can lead to damage to the insulation surrounding the copper strands due to the close proximity of the heat source to the buss bar. Thus, it would be desirable to provide a more efficient method to braze the lap joints of copper strands to copper buss bars without damaging the insulation surrounding the strands.

BRIEF SUMMARY OF THE INVENTION

This invention provides a more efficient means of induction brazing the lap joint between metal wires (e.g., copper strands) and a metal bar (e.g., a copper buss bar). Induction brazing involves the joining of two or more components without melting the component materials. In the process, a special filler alloy is melted between the components, i.e., the buss bar and copper strands, to form a complete sealing joint between the components. Specifically, the special alloy filler melts and wets both materials, with the filler held in the joint by capillary action. As the materials cool, the filler solidifies to form a joint. Induction brazing eliminates the need for heat shields and is thus beneficial in the close quarters of a transformer.

In accordance with an exemplary embodiment of the invention, the copper buss bar and the copper strands are thoroughly deburred and cleaned of any contaminants that may adversely effect the quality of the brazed joint. A special filler alloy, in shim or ribbon form, is placed in the joint area between the buss bar and the first of a group of copper strands. Filler alloy shims or ribbons are also placed in between each pair of copper strands. The wires are clamped in a specified location against the buss bar. An induction brazing coil is then located over the buss bar and centered over the stack of copper strands. The brazing coil design has been adapted to this particular process so that a separate coil is located on each side of the buss bar, but with a sufficiently small "profile" as not to engage adjacent buss bars. The joint is heated uniformly until the filler alloy begins to flow and sufficient time has passed for the alloy to flow throughout the joint. A fillet of the filler alloy will also form along the periphery of the joint. A braze alloy filler rod may be employed to supplement the filler alloy if not all areas have filler alloy evident. The finished braze should be smooth with no sharp edges.

According to one aspect, the invention relates to a method of brazing a metal strand to a metal bar comprising: a) positioning a thin filler shim on the surface of the bar; b) placing a metal strand on the filler strip; and c) heating the filler shim utilizing an induction brazing coil to a temperature sufficient to cause melting of the filler shim and to thereby form a brazed lap joint between the metal wire and the bar.

In another aspect, the present invention relates to a method of brazing a plurality of copper strands to a buss bar comprising: a) cleaning the buss bar and the copper strands; b) positioning a filler shim on the surface of the buss bar; c) placing a copper strand on the filler shim, the filler shim and the strand having substantially equal lengths; d) stacking additional copper strands on the buss bar, with a filler shim between each adjacent pair of strands; e) heating the filler shims utilizing an induction brazing coil to a temperature sufficient to cause melting of the filler shims and to thereby form a brazed lap joint between the copper strands and the buss bar.

Typically, the alloy filler shims are heated to about 1300°–1400° F., and each shim may have a thickness of about 0.005 inch.

The invention also relates to a buss bar and copper strand assembly formed by the above process.

DETAILED DESCRIPTION OF THE INVENTION

Figure 1:
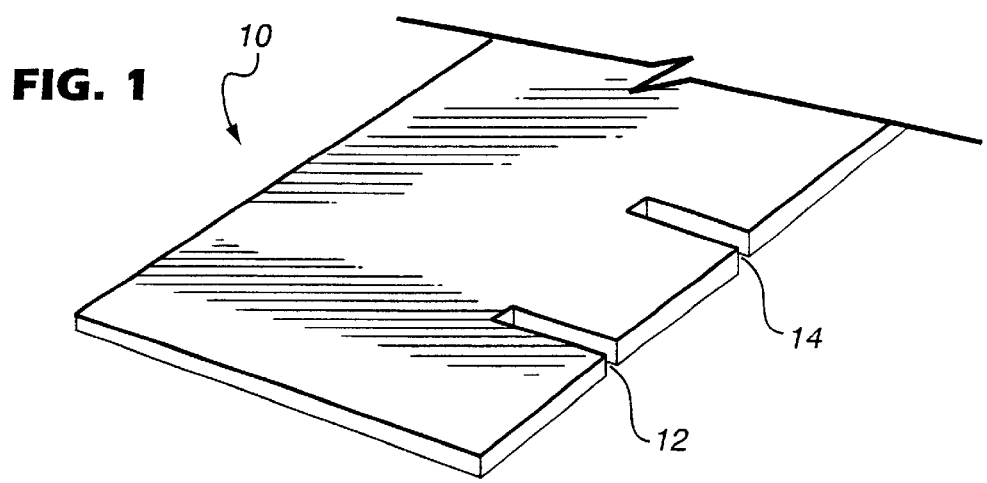
FIG. 1 is a partial perspective view of a buss bar utilizing the process of the invention.
Figure 2:
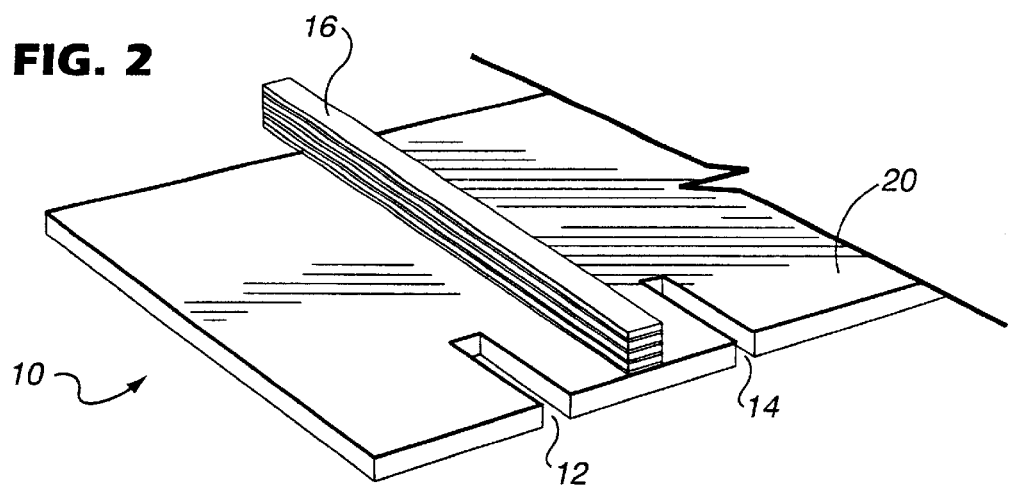
FIG. 2 is a partial perspective view of the buss bar as shown in FIG. 1, but with the copper strands in place prior to brazing.
Figure 3:
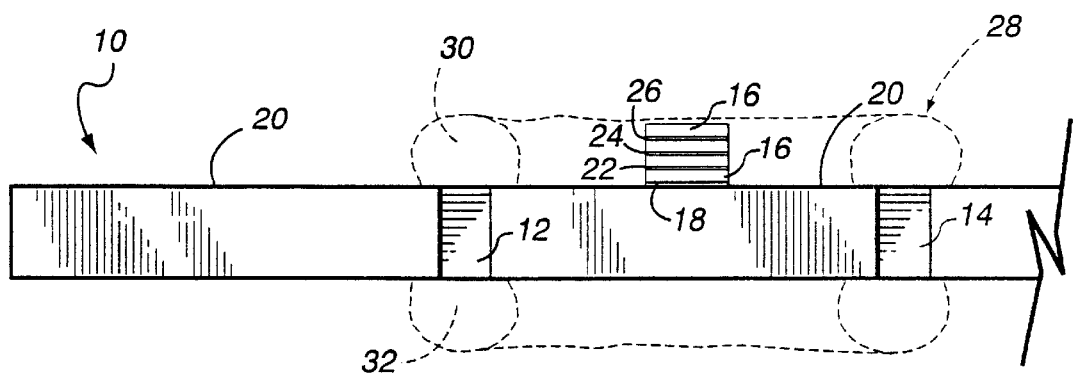
FIG. 3 is an end elevation of the buss bar and copper strands as shown in FIG. 2, but also illustrating an induction brazing coil (in phantom) used in the process in accordance with the invention.

With reference to FIG. 1, a typical buss bar 10 is an elongated copper bar having pairs of slots 12, 14, extending inwardly from opposite sides of the bar, in an alternating configuration. Typically, multiple copper strands or wires 16 (in stack form) are lap welded to the buss bar in a transverse direction, and generally centered between the slots. FIG. 2 and FIG. 3 illustrate a plurality of copper strands 16 extending transversely of one such buss bar, between the slots 12 and 14, with the strands in a vertically stacked relationship.

In accordance with the process of this invention, the copper buss bar 10 and the copper strands 16 are cleaned by any conventional and suitable technique to remove any dirt, oil, etc. A filler alloy shim or ribbon 18 is placed across the buss bar, between the first of the copper strands 16 and the surface 20 of the buss bar. This shim or ribbon 18 may be a silver-based alloy (e.g., one such alloy is known as "sil fos") with a thickness of about 0.005 inch. Similar shims or ribbons 22, 24 and 26 are placed between each of the copper wire strands 16. The stack of copper wire strands is then clamped by any suitable and conventional means, to the buss bar 10 to insure good contact.

Figure 4:
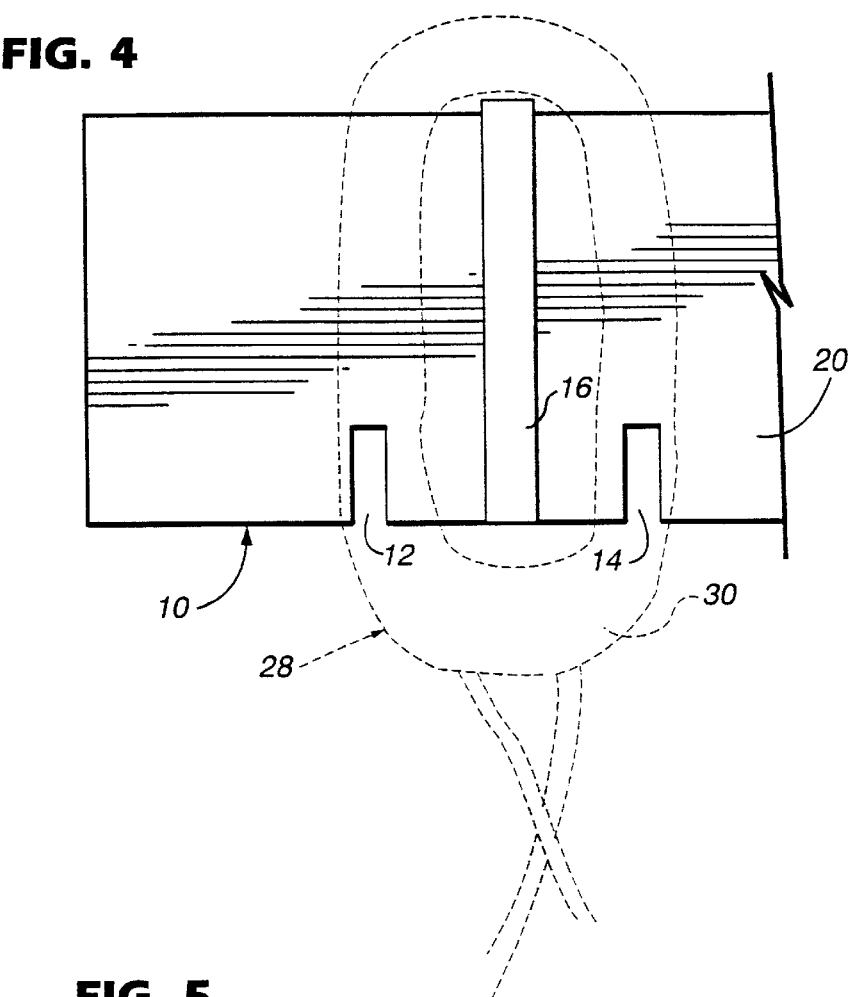
FIG. 4 is a top plan view of the buss bar shown in FIG. 2, again illustrating the induction brazing coil in phantom.
Figure 5:
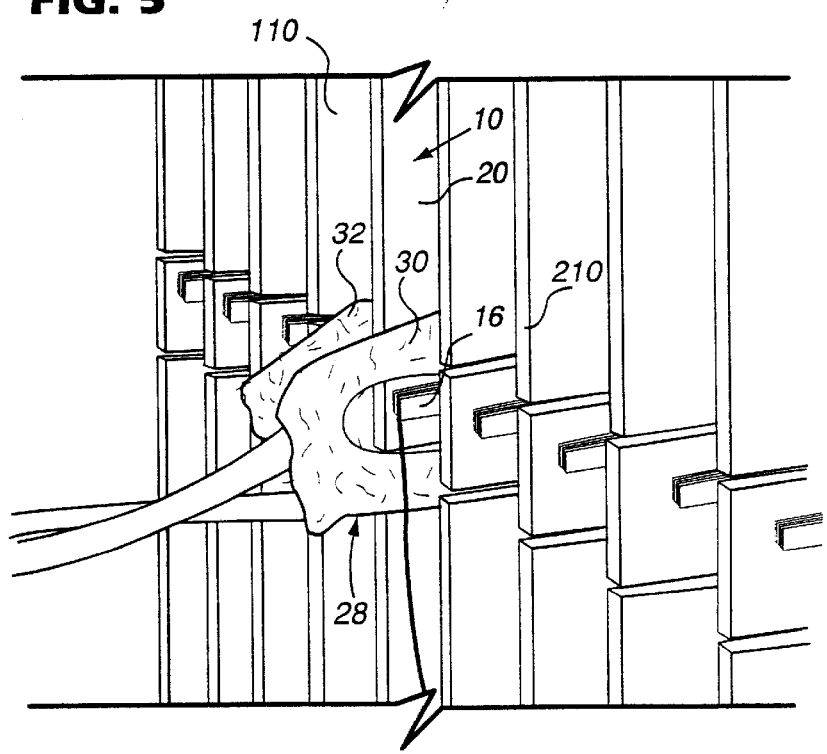
FIG. 5 is a partial perspective view of an induction coil located about a single buss bar in an array of buss bars.

A brazing coil 28 is then located over the buss bar 10, with discrete coil sections 30, 32 extending on both sides of the buss bar as illustrated in FIGS. 3, 4 and 5. The coil sections 30, 32 should be centered relative to the copper strands 16, and care must be taken not to allow the coil sections to contact adjacent buss bars 110, 210 within the transformer assembly.

The next step in the process is to heat the joint between components 10, 16 and filler shims 18, allowing the heat to soak evenly, until the sil fos material (or other appropriate filler alloy) flows throughout the joint. Preferably, the joint is heated to 1300°–1400° F., causing the sil fos shims to melt, wetting the surfaces between the buss bar 10 and the strands 16, and between adjacent strands, and creating a fillet around the joint, filling all voids or openings. If necessary, additional filler material may be added by way of a filler rod, to fill any discontinuities or gaps in the joint. The filler rod may be oriented manually at any desired location along the joint, such that it will be heated and flow into the melted filler from the ribbons of similar filler material.

The heat is regulated and additional filler alloy material added until all voids are filled in and so that the finished braze joint is smooth with no sharp edges or points. If necessary, however, the joint should be wire brushed to remove any impurities brought out by the brazing, and all sharp points should be filed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of brazing a plurality of copper strands to a buss bar comprising:
   a) cleaning the buss bar and the copper strands;
   b) positioning a filler shim on the surface of the buss bar;
   c) placing a copper strand on the filler shim;
   d) stacking additional copper strands on the buss bar, with a filler shim between each adjacent pair of strands;
   e) heating the filler shims utilizing an induction brazing coil to a temperature sufficient to cause melting of the filler shims and to thereby form a brazed lap joint between the copper strands and the buss bar.

2. The method of claim 1 wherein said filler shims are constructed of a silver-based alloy.

3. The method of claim 2 wherein said filler shims are heated to about 1300°–1400° F.

4. The method of claim 3 wherein each filler shim has a thickness of about 0.005 inch.

5. The method of claim 1 wherein said filler shims are heated to about 1300°–1400° F.

6. The method of claim 1 wherein each filler shim has a thickness of about 0.005 inch.

7. The method of claim 1 wherein, during step e), discrete brazing coil sections are located on opposite sides of said buss bar and centered with respect to said copper strands.

8. The method of claim 1 wherein said buss bar is in an assembly of multiple buss bars.

9. The method of claim 1 wherein, during step e), supplemental alloy material is added by way of a filler rod.

10. A buss bar and copper strand assembly joined according to the process of claim 1.

11. A method of brazing a plurality of copper strands to a buss bar comprising:
    a) cleaning the buss bar and the copper strands;
    b) positioning a filler shim on the surface of the buss bar;
    c) placing a copper strand on the filler shim;
    d) stacking additional copper strands on the buss bar, with a filler shim between each adjacent pair of strands; and
    e) heating the filler shims utilizing an induction brazing coil to a temperature sufficient to cause melting of the filler shims and to thereby form a brazed lap joint between the copper strands and the buss bar;
    wherein, during step e), discrete brazing coil sections are located opposite sides of said buss bar and centered with respect to said copper strands.

* * * * *